(12) United States Patent
Malladi et al.

(10) Patent No.: US 11,262,980 B2
(45) Date of Patent: *Mar. 1, 2022

(54) COMPUTING ACCELERATOR USING A LOOKUP TABLE

(71) Applicant: Samsung Electronics Co., Ltd., Suwon-si (KR)

(72) Inventors: Krishna T. Malladi, San Jose, CA (US); Peng Gu, Santa Barbara, CA (US); Hongzhong Zheng, Los Gatos, CA (US); Robert Brennan, Santa Clara, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,043

(22) Filed: Jul. 1, 2020

(65) Prior Publication Data

US 2020/0334012 A1    Oct. 22, 2020

Related U.S. Application Data

(63) Continuation of application No. 15/916,196, filed on Mar. 8, 2018, now Pat. No. 10,732,929.

(60) Provisional application No. 62/615,334, filed on Jan. 9, 2018.

(51) Int. Cl.
*G06F 7/487* (2006.01)
*G06F 7/499* (2006.01)
*G06F 7/523* (2006.01)

(52) U.S. Cl.
CPC ........ *G06F 7/4876* (2013.01); *G06F 7/49936* (2013.01); *G06F 7/523* (2013.01)

(58) Field of Classification Search
CPC .... G06F 7/4876; G06F 7/523; G06F 7/49936; G06F 17/153; G06N 3/0454
USPC ......................................................... 708/503
See application file for complete search history.

(56) References Cited

U.S. PATENT DOCUMENTS

| | | | |
|---|---|---|---|
| 4,566,075 A | 1/1986 | Guttag | |
| 5,117,385 A | 5/1992 | Gee | |
| 5,255,216 A | 10/1993 | Blanz et al. | |
| 5,268,853 A | 12/1993 | Tanaka et al. | |
| 5,586,070 A * | 12/1996 | Purcell | G06F 7/5324 |
| | | | 708/620 |
| 7,908,464 B2 | 3/2011 | Mittal et al. | |
| 8,195,735 B2 * | 6/2012 | Hansen | G06F 17/16 |
| | | | 708/607 |
| 9,158,540 B1 | 10/2015 | Tzelnic et al. | |
| 10,776,078 B1 * | 9/2020 | Clark | G06F 7/4876 |

(Continued)

*Primary Examiner* — Tan V Mai
(74) *Attorney, Agent, or Firm* — Lewis Roca Rothgerber Christie LLP

(57) ABSTRACT

A computing accelerator using a lookup table. The accelerator may accelerate floating point multiplications by retrieving the fraction portion of the product of two floating-point operands from a lookup table, or by retrieving the product of two floating-point operands of two floating-point operands from a lookup table, or it may retrieve dot products of floating point vectors from a lookup table. The accelerator may be implemented in a three-dimensional memory assembly. It may use approximation, the symmetry of a multiplication lookup table, and zero-skipping to improve performance.

17 Claims, 4 Drawing Sheets

(56) References Cited

U.S. PATENT DOCUMENTS

2016/0170849 A1   6/2016   Cheng et al.

* cited by examiner

COMPUTING ACCELERATOR USING A LOOKUP TABLE

CROSS-REFERENCE TO RELATED APPLICATION(S)

The present application is a continuation of U.S. patent application Ser. No. 15/916,196, filed Mar. 8, 2018, entitled "COMPUTING ACCELERATOR USING A LOOKUP TABLE", which claims priority to and the benefit of U.S. Provisional Application No. 62/615,334, filed Jan. 9, 2018, entitled "SOFTWARE DEFINED LOOKUP COMPUTING AI ACCELERATOR SYSTEM ARCHITECTURE", the entire contents of all documents identified in this paragraph are hereby incorporated herein by reference as if fully set forth herein.

FIELD

One or more aspects of embodiments according to the present invention relate to computing, and more particularly to a system and method for accelerated computing using one or more lookup tables.

BACKGROUND

Various operations used for artificial intelligence systems, including neural network systems, may use operations such as multiplication and matrix multiplication, and the time consumed by each multiplication, or the time consumed by a matrix multiplication, may significantly affect the overall performance of the system.

Thus, there is a need for a system and method for efficiently performing calculations such as multiplications or matrix multiplications.

SUMMARY

Aspects of embodiments of the present disclosure are directed toward a computing accelerator using a lookup table. The accelerator may accelerate floating point multiplications by retrieving the fraction portion of the product of two floating-point operands from a lookup table, or by retrieving the product of two floating-point operands of two floating-point operands from a lookup table, or it may retrieve dot products of floating point vectors from a lookup table. The accelerator may be implemented in a three-dimensional memory assembly. It may use approximation, the symmetry of a multiplication lookup table, and zero-skipping to improve performance.

According to an embodiment of the present invention there is provided a method for calculating a product of a first floating-point number and a second floating-point number, the method including: forming an address from: a first factor, the first factor being a factor of the first floating-point number, and a second factor, the second factor being a factor of the second floating-point number; and retrieving, from a location in a lookup table, the location being identified by the address, the product of the first factor and the second factor.

In one embodiment, the first factor is a fraction portion of the first floating-point number and the second factor is the fraction portion of the second floating-point number.

In one embodiment, the method includes calculating an exponent of the product of the first floating-point number and the second floating-point number as a sum of: the exponent of the first floating-point number, and the exponent of the second floating-point number; less: a left-shift number equal to a leading zero count in a 2n-bit product of: a first number formed by appending a leading one to the first factor, and a second number formed by appending a leading one to the second factor, wherein: n is one plus a bit-length of the first factor.

In one embodiment, the method includes determining the left-shift number with a digital logic circuit.

In one embodiment, the method includes retrieving, from a location in a lookup table identified by the address, the left-shift number.

In one embodiment, the forming of the address includes: concatenating a portion of the first factor and a portion of the second factor.

In one embodiment, the concatenating of the portion of the first factor and the portion of the second factor includes concatenating the portion of the first factor and the portion of the second factor in order according to their respective values.

In one embodiment, the portion of the first factor is the entire first factor, and the portion of the second factor is the entire second factor.

In one embodiment, the method includes the most significant bit of the first factor; and the portion of the second factor is: less than the second factor in its entirety, and a contiguous subset of bits of the second factor, including the most significant bit of the second factor.

In one embodiment, the first factor is the first floating point number in its entirety and the second factor is the floating point number in its entirety.

In one embodiment, the method includes creating the lookup table, the creating including: calculating an element of the lookup table; and storing the element in memory.

According to an embodiment of the present invention there is provided a system for calculating a product of a first floating-point number and a second floating-point number, the system including: a processing circuit, and a memory, the processing circuit being configured to: form an address from: a first factor of the first floating-point number, and a second factor of the second floating-point number; and retrieve, from a location, in a lookup table, identified by the address, the product of the first factor and the second factor, the lookup table being stored in the memory.

In one embodiment, the system includes: a stack of two or more memory chips and a logic chip including the processing circuit.

In one embodiment, the first factor is a fraction portion of the first floating-point number and the second factor is a fraction portion of the second floating-point number.

In one embodiment, the forming of the address includes: concatenating a portion of the first factor and a portion of the second factor.

In one embodiment, the concatenating of the portion of the first factor and the portion of the second factor includes concatenating the portion of the first factor and the portion of the second factor in order according to their respective values.

In one embodiment, the portion of the first factor is the first factor in its entirety, and the portion of the second factor is the second factor in its entirety.

In one embodiment, the system includes the most significant bit of the first factor; and the portion of the second factor is: less than the second factor in its entirety, and a contiguous subset of bits of the second factor, including the most significant bit of the second factor.

In one embodiment, the first factor is the first floating point number in its entirety and the second factor is the second floating point number in its entirety.

According to an embodiment of the present invention there is provided a method for calculating a dot product of a first floating-point vector and a second floating-point vector, the method including: forming an address from: a first element of the first floating-point vector, a second element of the first floating-point vector, a first element of the second floating-point vector, and a second element of the second floating-point vector; and retrieving, from a location in a lookup table identified by the address, the dot product.

In one embodiment, each of the first element of the first floating-point vector, the second element of the first floating-point vector, the first element of the second floating-point vector, and the second element of the second floating-point vector is an 8-bit floating-point number.

According to an embodiment of the present invention there is provided a method for calculating a convolution of a first floating-point matrix and a second floating-point matrix, the method including: creating a lookup table containing results of matrix convolution operations; forming an address from: elements of the first matrix, and elements of the second matrix; and retrieving, from a location in the lookup table, the location being identified by the address, the convolution of the first floating-point matrix and the second floating-point matrix.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a computing accelerator using a lookup table provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1:
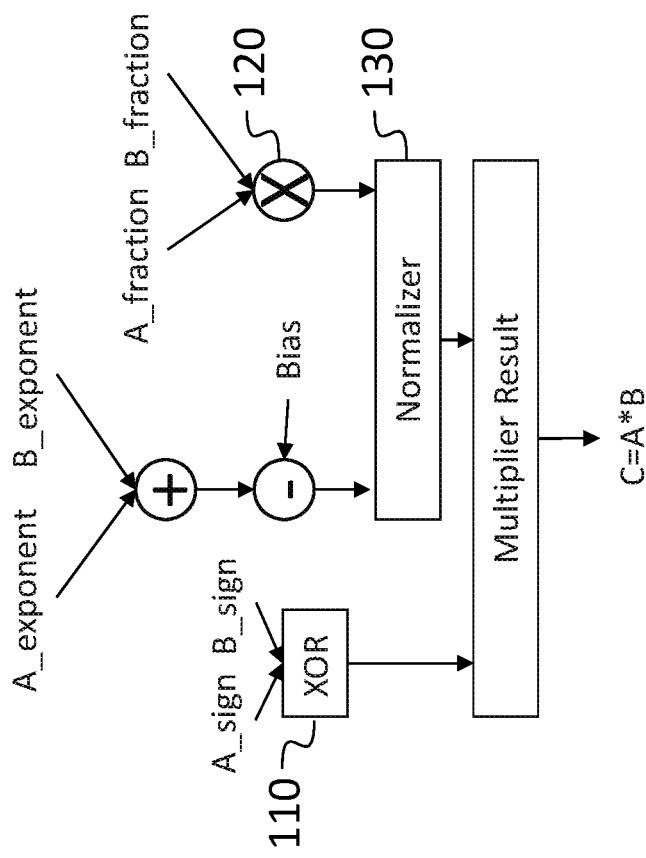
FIG. 1 is a block diagram illustrating a floating-point multiplication, according to an embodiment of the present invention.

Referring to FIG. 1, multiplying two floating-point numbers (or "operands") may involve several steps. Each floating-point number may include a sign bit, an exponent (that may be a signed integer) and a fraction. For example, in the IEEE standard 754 floating-point representation, a floating point number may be represented with 32 bits, of which one bit is a sign bit, eight bits are an exponent (represented as a signed (two's complement) integer) and 23 bits are a fraction (or "fraction portion") of the floating-point number. The fraction may be an unsigned number with an implied leading 1. The sequence of bits consisting of the fraction, with a leading one appended to the left of it (i.e., with the implied leading 1 appended explicitly), may be referred to herein as the "augmented fraction".

In this representation, the floating point number may represent a number, the fixed-point representation of which maybe formed by appending a leading 1 bit to the left of the fraction portion, placing the point (i.e., the binary point) to the right of the leading 1, shifting the number to the left (i.e., shifting the point to the right) by a number of bit positions equal to the exponent (or, if the exponent is negative, shifting the number to the left (i.e., shifting the point to the right) by a number of bit positions equal to the opposite of the value of the exponent), and then changing the sign of the resulting fixed point number if the sign bit of the floating-point representation is one.

To multiply two floating-point operands as shown in FIG. 1, the sign bits of the two floating-point numbers may be combined with an exclusive or (XOR) circuit 110, the exponents of the two floating-point numbers may be added (i.e., using signed addition, or, as shown, in FIG. 1, unsigned addition with an appropriate bias) and the fractions of the two floating-point numbers may be multiplied, by a multiplier 120. Before multiplying the fractions, the implied leading ones may be appended to the left of the fractions of the two floating-point numbers, to form two augmented fractions corresponding to the fractions of the two floating-point numbers respectively.

The product of the augmented fractions and the sum of the exponents may then be normalized, by a normalizing circuit 130, to form the exponent and fraction of the product of the two floating-point numbers. If the product of the augmented fractions is not zero, the normalization may involve (i) forming the product, as a 2n-bit unsigned integer (n being the bit width of each of the augmented fractions) of the augmented fractions, truncating any leading zeros from the product of the augmented fractions, and truncating a number of least significant bits from the product of the augmented fractions so that the number of bits remaining after the truncation is n, and deleting the leading 1 to form the fraction of the floating-point product (of the two floating-point operands). The fraction of the floating-point product may be referred to as the "normalized product" of the fractions of the two floating-point operands (or, equivalently, as the "normalized product" of the augmented fractions of the two floating-point operands). The exponent may then be adjusted, if needed, by subtracting from it a "left-shift number" to compensate for the truncation of any leading zeros from the product of the augmented fractions. The left-shift number may be equal to the number of leading zeroes in the product of the augmented fractions. This number of leading zeros (or "leading zero count") may in each case be either one or zero. If the product of the augmented fractions is zero, then normalization may involve setting the fraction of the floating-point product to zero and setting exponent of the floating-point product to be equal to the sum of the exponents of the operands.

Figure 2:
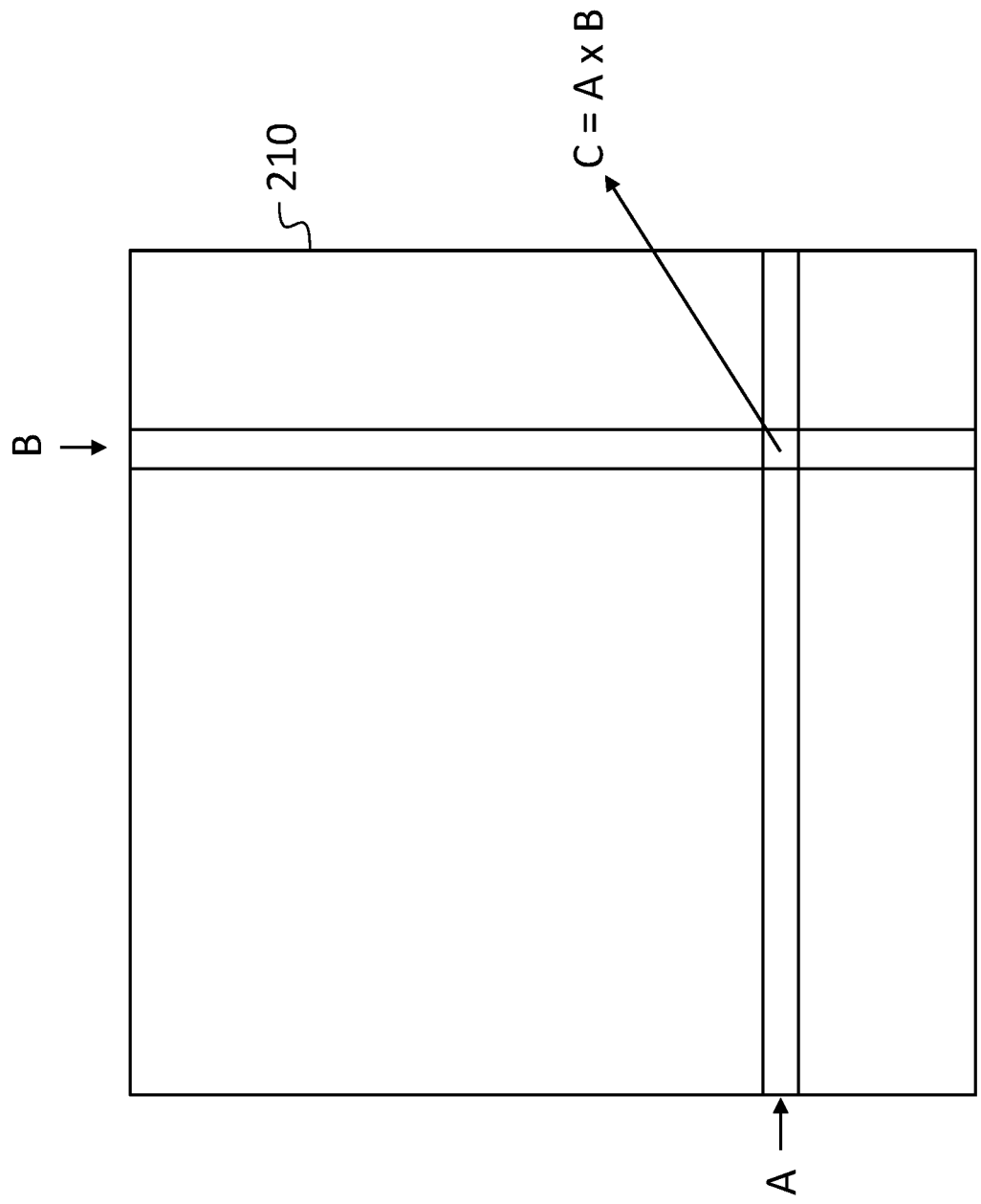
FIG. 2 is an illustration of a lookup table, according to an embodiment of the present invention.

The processing of the fractions of the two floating-point operands to form the fraction of the floating-point product of the two floating-point operands may be performed by a lookup table. FIG. 2 shows a lookup table that contains, in a cell at a row corresponding to the value of a first operand A and at a column corresponding to the value of a second operand B, the product A×B. For example, for a floating-point representation with a 23-bit fractional part having $2^{23}=8,388,608$ possible values, a 8,388,608×8,388,608 lookup table may be used, each row corresponding to one of the 8,388,608 possible values of the fraction of the first floating-point operand, and each column corresponding to one of the 8,388,608 possible values of the fraction of the second floating-point operand. The table may be created by storing in each cell the normalized product of (i) the fraction value corresponding to the row in which the cell is and (ii) the fraction value corresponding to the column in which the cell is.

In operation, the fraction of the product of the two floating-point operands may be "looked up", i.e., read out of the table by forming an address from (i) the fraction of the first floating-point number and (ii) the fraction of the second floating-point number, the address being the address of the cell containing the fraction of the product of the two floating-point operands. For example, the table may be stored in the memory of a processing circuit having memory (or, equivalently, in a memory connected to a processing circuit) as a one-dimensional array, the first 8,388,608 elements of which are the first row of the table, the next 8,388,608 elements of which are the second row of the table, and so forth. If each fraction stored in the table occupies one address (e.g., if the memory is 32 bits wide, and the fractions are 23 bits wide, and the remaining 9 bits are unused or used for another purpose), then the address may be formed simply by concatenating the bits of the fraction of the first floating-point number and the bits of the fraction of the second floating-point number to form the address (which is an unsigned integer having twice as many bits as either of the two fractions).

This approach may also be used to multiply floating point numbers in different floating-point representations having fractions of different lengths. In such a case the table may be rectangular instead of being square. For example, if the first floating-point number is a single-precision (32-bit) floating-point number with a 23-bit fraction and the second floating-point number is a double-precision (64-bit) floating-point number with a 52-bit fraction, then the table may have 8,388,608 rows and $2^{52}$ columns.

In some embodiments, the size of the table may be reduced by approximately a factor of two by, for each lookup (taking advantage of the commutative property of multiplication), concatenating the two fractions in order according to their respective values, e.g., with the larger one first (i.e., in the more significant bits of the address) and the smaller one second (i.e., in the less significant bits of the address). In this case a portion of the lookup table (corresponding to a triangular region of the lookup table, if the lookup table is drawn as a square, two-dimensional data structure) may be unused, and available for other uses, or, if a suitable memory circuit is used, these portions of memory may not be implemented (i.e., they may not exist). In other embodiments the table may be stored as a set of rows of unequal (e.g., monotonically increasing or monotonically decreasing) lengths, and the address of the cell corresponding to the fraction sought may be calculated accordingly.

Figure 3:
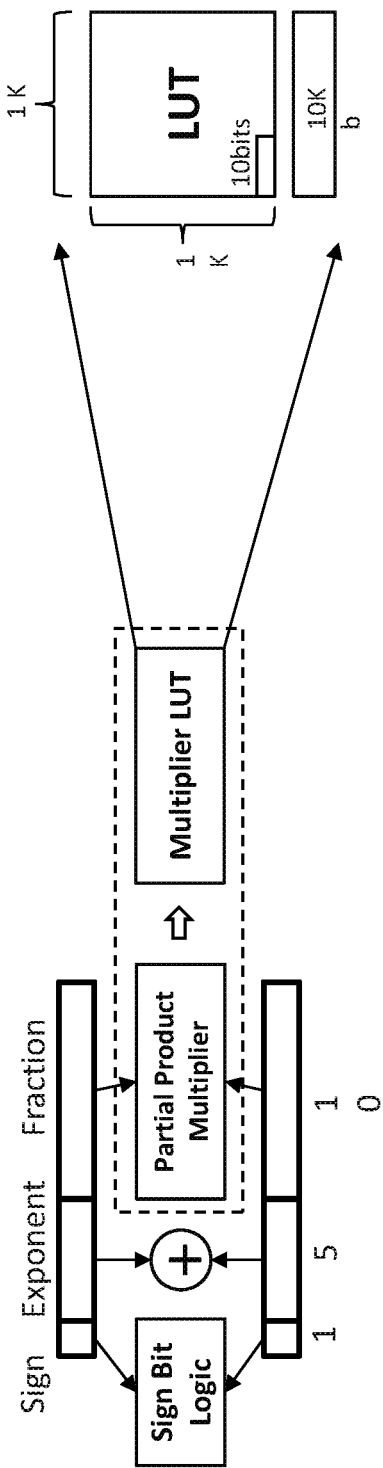
FIG. 3 is a block diagram illustrating a floating-point multiplication, according to an embodiment of the present invention.

Referring to FIG. 3, if a half-precision (16-bit) floating-point representation (with a 10 bit fraction) is used for both of the operands, then the size of the lookup table may be only 1024×1024, with each cell storing a 10 bit fraction.

In some embodiments, improvements in performance may be achieved by not performing multiplications in which either operand is zero, e.g., shunting any pair of two floating-point operands to a bypass unit when either of the two floating-point operands is zero.

In some embodiments, improvements in performance may be achieved by using approximation. This may be accomplished, for example, by truncating the fraction of the first floating-point operand and the fraction of the second floating-point operand, and forming an address from the truncated fractions, the address identifying a cell in a correspondingly smaller table. The truncating of each of the fractions may involve using only a portion of the fraction, the portion consisting of a proper subset of the bits of the fraction, the subset being a contiguous subset including the most significant bit of the fraction.

In some embodiments, instead of using a lookup table only to determine the product of the fractions of the two floating-point operands, a lookup table may be employed to look up the floating-point product of the two floating-point operands. For example, if half-precision (16-bit) floating-point representation is used for both of the operands, then a $2^{16} \times 2^{16}$ (i.e., 65,536×65,536) lookup table may be used, each cell of the lookup table containing the 16-bit product of (i) the floating-point number corresponding to the row in which the cell is and (ii) the floating-point number corresponding to the column in which the cell is.

As used herein, a "factor" of a floating-point number means either (i) the fraction portion of the floating-point number, or (ii) the entire floating point number, and an embodiment in which the product of a factor of a first floating-point number and a factor of a second floating-point number is looked up in a lookup table may be either (i) an embodiment in which a product of two floating-point operands is calculated by looking up the product of the fraction portions of the two floating-point operands in a lookup table, or (ii) an embodiment in which a product of two floating-point operands is calculated by looking up the product of the two floating-point operands in a lookup table.

In some embodiments in which a product of two floating-point operands is calculated by looking up the product of the fraction portions of the two floating-point operands in a lookup table, the left-shift number may also be obtained using a lookup table, e.g., parallel lookup table to the one used to look up the product of the fraction portions, or the same lookup table (in which each cell may have a bit width greater than the width of the product of the fraction portions, and one or more excess bits may be used to store the left-shift number). In other embodiments, the left-shift number may be calculated by a suitable logic circuit, e.g., a circuit with 2n inputs where n is the length of the fraction part of each of the first floating-point number and the second floating-point number, and one or more outputs for outputting the left-shift number.

In some embodiments other operations such as dot products or matrix convolutions may be performed using a lookup table. For example, the dot product of two 2×1 vectors may be computed using a single lookup in a lookup table that has $2^{32}$ (approximately 4 billion) cells ($2^{16}$ rows and $2^{16}$ columns) if each element of each vector is represented in a quarter-precision (8-bit) floating-point representation. In such an embodiment the four elements (two elements from each of the two two-element vectors) may be concatenated to form the 32 bit address of the lookup table cell containing the dot product. As used herein, the term "matrix" encompasses vectors (i.e., a vector may be considered to be a 1×n or n×1 matrix).

Figure 4:
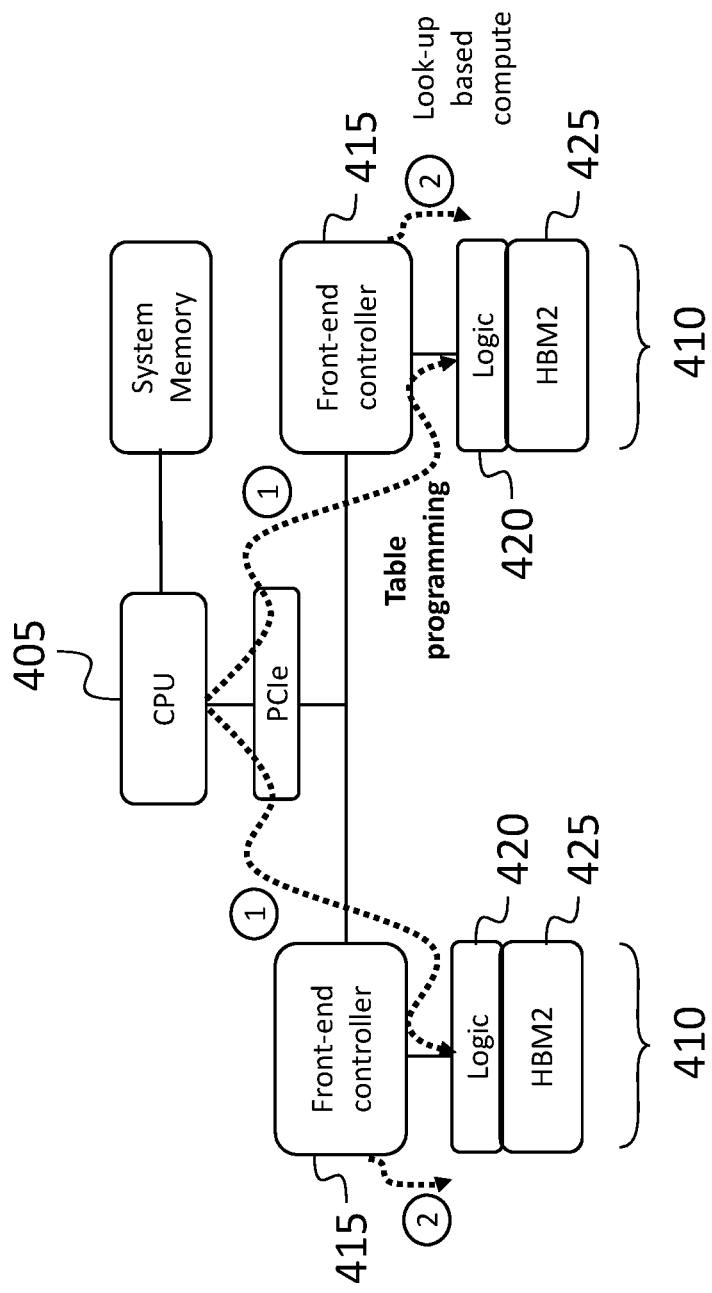
FIG. 4 is an illustration of a scalable accelerator architecture, according to an embodiment of the present invention.

Referring to FIG. 4, in some embodiments an accelerator using an embodiment of the present invention is on a card. Components on the card include a Peripheral Component Interconnect Express (PCIe) or dynamic random access memory (DRAM) interface based accelerator card, a direct memory access (DMA) engine, an interface controller with flow control, and a power controller. The central processing unit (CPU) 405 acts as front-end host, providing, for example, heterogeneous integration with a graphics processing unit (GPU), or a field programmable gate array (FPGA) (which may be on other cards). System scaling may be accomplished as shown in FIG. 4, with multiple memory stacks 410 behind the CPU 405 (or a GPU, FPGA, or application specific integrated circuit (ASIC)). A central scheduler distributes tasks between multiple memory stacks 410, collects results and computes final results.

Each memory stack 410 may include a front-end controller 415, a three-dimensional memory assembly including a logic chip 420 (e.g., a high-bandwidth memory (HBM) logic die), and a stack 425 of memory chips. Accumulation and other functions may be implemented on the logic chip, in co-ordination with the CPU 405. The logic chip 420 may decode controller commands, and issue internal micro-operations to initiate lookup-based computation. Cache memory and a cache controller may be implemented as sub-systems (also on the logic chip 420, e.g., in static random access memory (SRAM) on the logic die. Caches may be SRAM or embedded DRAM.

The memory interface may be a synchronous HBM interface with a one-step protocol with a deterministic timing specification. It may use either a synchronous or a two-step transactional interface (between the logic chip 420 and the stack 425 of memory chips). In another embodiment, the memory interface is asynchronous with a two-step protocol, to use transactional commands with physical layer (PHY) modifications for new transaction pins.

A library application programming interface (API) may include application frameworks modified with instruction sets that can be recognized by the host processor (e.g., the CPU 405). This API may be used to enable the CPU 405 to use the accelerator card or cards. The execution of functions in the API may be scheduled on the logic chip 420 using an instruction set architecture (ISA).

Control flow may proceed as follows. A program may register to the specific nature of a computation to be performed. It may then load pre-computed tables at specified address ranges. This flow may enable operand-based lookup during run time; exception handling may also be included in the lookup table. Floating point exceptions, for example, may include invalid operation, division by zero, underflow, overflow, and inexact. The look-up-table allows the exceptions to be handled while programming the table itself. In particular, the software control algorithm may avoid populating such incorrect values to be populated in the look up table when it is programmed. Lookup tables may be used to compute expensive results. The logic chips 420 in the memory stacks 410 may be programmed to accelerate different respective operations. For example, in the system of FIG. 4, a first logic chip 420 (of the two logic chips 420 illustrated) may be programmed to perform floating-point multiplications (and a suitable lookup table may be stored in the stack 425 of memory chips associated with the first logic chip 420), and a second logic chip 420 (of the two logic chips 420 illustrated) may be programmed to calculate dot products (and a suitable lookup table may be stored in the stack 425 of memory chips associated with the second logic chip 420). Application frameworks may then directly utilize the results generated by the accelerators.

As used herein, a "portion" of a number represented by a sequence of bits (e.g., a floating point number, or the fraction portion of a floating point number, or an integer) is either the entire sequence of bits, or a contiguous proper subset of the sequence of bits. As used herein, the "product" of two fraction portions of two respective floating-point operands is the fraction portion of the floating-point number (in the same floating-point representation as each of the two operands) that results from a floating point-multiplication of the two operands. If the two operands are in different floating-point representations (e.g., floating-point representations having fractions of unequal lengths), the "product" of the two fraction portions is the fraction of the floating point product, expressed in the floating point representation (of the floating-point representations of the two operands) having the shorter fraction portion.

It will be understood that in general the product of two floating-point numbers, represented as a floating-point number with the same precision as one of the operands, will be approximate because normalization will result in the truncation of some non-zero bits. As such, the "product" of the two floating-point operands means either (i) the exact product (e.g., if truncation results in the truncation of only zero bits) or (ii) an approximate product of the two floating-point numbers.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a computing accelerator using a lookup table have been specifically described and illustrated herein, many modifications and variations will be apparent to those skilled in the art. Accordingly, it is to be understood that a computing accelerator using a lookup table constructed according to principles of this invention may be embodied other than as specifically described herein. The invention is also defined in the following claims, and equivalents thereof.

What is claimed is:

1. A method for calculating a first function based on a first number and a second number, the method comprising:
    forming an address from:
        a first factor, the first factor being a factor of the first number and comprising a first portion of the first number and a second portion of the first number, and
        a second factor, the second factor being a factor of the second number and comprising a first portion and a second portion of the second number, the address being formed by concatenating a portion of the first factor and a portion of the second factor; and
    retrieving, from a location identified by the address, the first function based on the first factor and the second factor,
    wherein the first number and the second number are in a same representation, the method further comprising calculating a second function based at least in part on the first function.

2. The method of claim 1, wherein the first portion of the first number is a fraction portion of the first number.

3. The method of claim 1, wherein the first number is a first floating-point number, and the second number is a second floating-point number, and wherein the calculating of the second function comprises calculating an exponent as a sum of:
    the second portion of the first number, and
    the second portion of the second number;
    less:
        a left-shift number equal to a leading zero count in a 2n-bit product of:
            a first number formed by appending a leading one to the first portion of the first factor, and
            a second number formed by appending a leading one to the first portion of the second factor,
        wherein:
            n is one plus a bit-length of the first factor.

4. The method of claim 3, further comprising determining the left-shift number with a digital logic circuit.

5. The method of claim 3, further comprising retrieving, from a location identified by the address, the left-shift number.

6. The method of claim 1, wherein the concatenating of the portion of the first factor and the portion of the second factor comprises concatenating the portion of the first factor and the portion of the second factor in order according to their respective values.

7. The method of claim 1, wherein the portion of the first factor is an entire first factor, and the portion of the second factor is an entire second factor.

8. The method of claim 1, wherein:
    the portion of the first factor is:
        less than the first factor in its entirety, and
        a contiguous subset of bits of the first factor, including a most significant bit of the first factor; and
    the portion of the second factor is:
        less than the second factor in its entirety, and
        a contiguous subset of bits of the second factor, including a most significant bit of the second factor.

9. The method of claim 1, wherein the first factor is the first number in its entirety and the second factor is the second number in its entirety.

10. The method of claim 1, further comprising creating a lookup table comprising the location identified by the address, the creating comprising:
    calculating an element of the lookup table; and
    storing the element in memory.

11. A system for calculating a first function based on a first number and a second number, the system comprising:
    a processing circuit, and
    a memory,
    the processing circuit being configured to:
        form an address from:
            a first factor, the first factor being a factor of the first number and comprising a first portion of the first number and a second portion of the first number, and
            a second factor, the second factor being a factor of the second number and comprising a first portion and a second portion of the second number, the address being formed by concatenating a portion of the first factor and a portion of the second factor; and
        retrieve, from a location, in the memory, identified by the address, the first function based on the first factor and the second factor,
    the processing circuit being further configured to calculate a second function based at least in part on the first function.

12. The system of claim 11, wherein the memory is a three-dimensional memory assembly comprising:
    a stack of two or more memory chips and
    a logic chip comprising the processing circuit.

13. The system of claim 11, wherein the first portion of the first number is a fraction portion of the first number.

14. The system of claim 11, wherein the concatenating of the portion of the first factor and the portion of the second factor comprises concatenating the portion of the first factor and the portion of the second factor in order according to their respective values.

15. The system of claim 14, wherein the portion of the first factor is the first factor in its entirety, and the portion of the second factor is the second factor in its entirety.

16. The system of claim 14, wherein:
    the portion of the first factor is:
        less than an entire first factor, and
        a contiguous subset of bits of the first factor, including a most significant bit of the first factor; and
    the portion of the second factor is:
        less than the second factor in its entirety, and
        a contiguous subset of bits of the second factor, including a most significant bit of the second factor.

17. The system of claim 11, wherein the first factor is the first number in its entirety and the second factor is the second number in its entirety.

\* \* \* \* \*